Patented Feb. 22, 1944

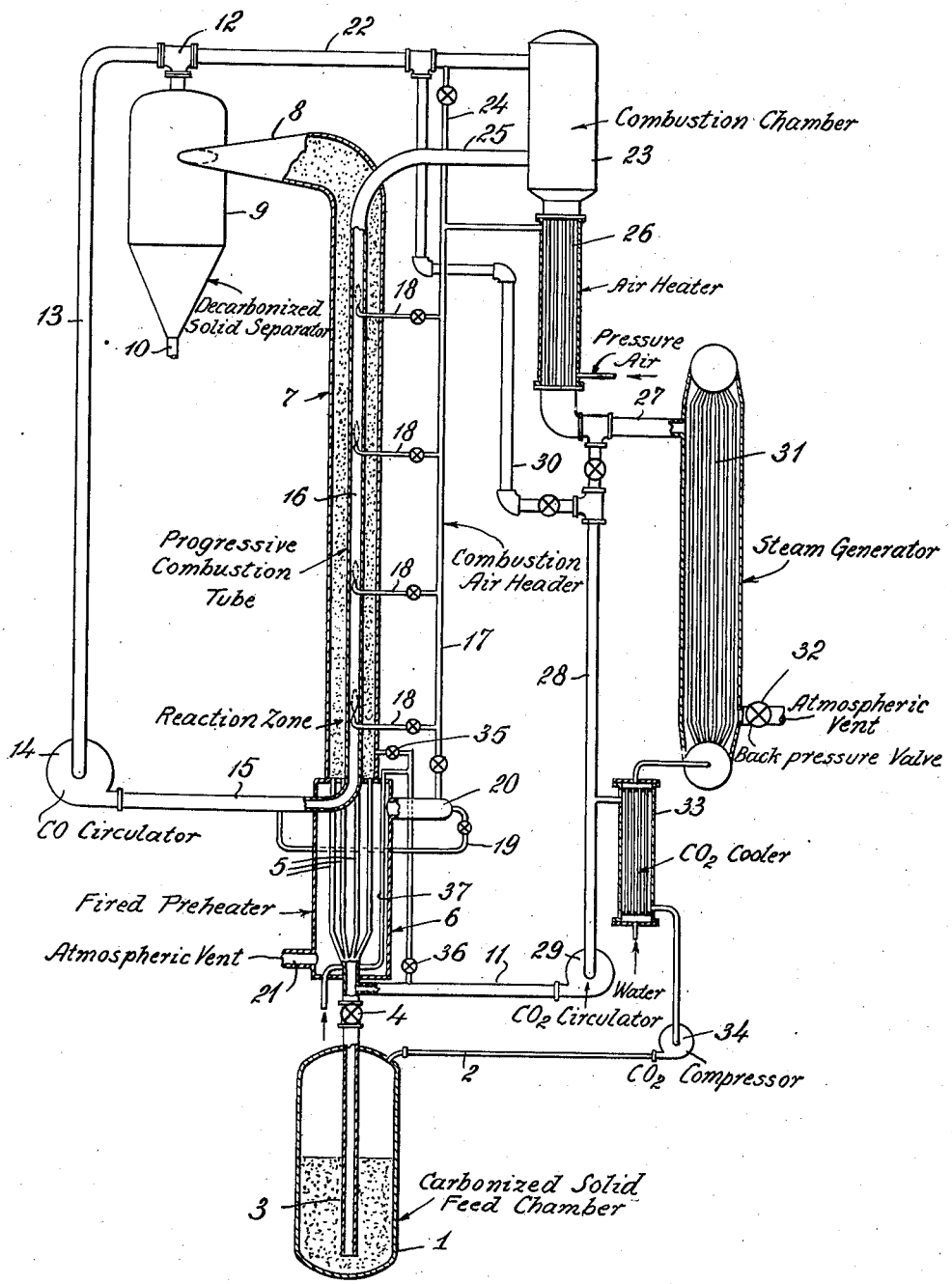

2,342,622

UNITED STATES PATENT OFFICE 2,342,622

APPARATUS FOR RECOVERING SPENT ADSORBENT MATERIAL

Fred L. Fast, Woodbury, N. J., assignor to Socony-Vacuum Oil Company, Incorporated, New York, N. Y., a corporation of New York Original application October 1, 1938, Serial No. 232,745. Divided and this application December 19, 1940, Serial No. 370,753

5 Claims. (Cl. 202—121)

Numerous processes, such as the percolation filtration of mineral petroleum oils; clarification of oils, fats, sugar, etc., by filtration; and similar processes, result in contamination of the adsorbent mass used by combustible carbonaceous material. Similarly many catalytic processes using as a catalyst an adsorbent or refractory contact mass which is catalytic in nature or has a catalyst material supported upon it or impregnated in it also contaminate the contact mass with a combustible carbonaceous material. It is customary to regenerate such adsorbents and contact masses by burning off the contaminant. This invention is specifically concerned with such processes of regeneration.

Such processes must operate within narrowly defined limits of temperature. The temperature must be sufficiently high to enable combustion to take place, yet it must not be too high, for practically all of the adsorbents so used may be permanently damaged by temperatures readily reached. As an illustrative example, without being limited thereto, the regeneration of spent fuller's earth from a process of petroleum refining may be considered. This material may be damaged seriously by exposure to temperatures above about 1100°–1200° F. for any length of time. Yet it must be heated to at least about 800°–850° F., and preferably between about 850° and about 1050° F., to undergo combustion, and the combustion is highly exothermic when the carbonaceous material is burned with air as is conventional. Consequently, such regenerations are difficult to control.

This invention has for a principal object the provision of an apparatus for the regeneration of spent adsorbent material wherein the material undergoing regeneration is subjected to an endothermic regeneration reaction in a cyclic process wherein an exothermic reaction is separately conducted, the endothermic reaction and the exothermic reaction being conducted in parallel to secure control of the regeneration. Other objects are in part obvious and in part appear hereinafter.

This invention is based upon the carrying out of the indicated regeneration as an endothermic reaction, products from which undergo an exothermic reaction so conducted as to supply heat for the primary endothermic reaction.

To enable convenient explanation of this invention, reference is made to the drawing attached to this specification. The single figure of this drawing is a diagrammatic representation of an apparatus suitable for carrying out any process, wherein 1 is a chamber containing spent adsorbent to be regenerated, and 2 is a pipe through which compressed gas is led thereinto. Pipe 3 depends toward the bottom of 1 and when valve 4 is opened, adsorbent will pass upward through 3, 4, tubes 5 in preheater 6, and then through the annular passage within 7, where it is regenerated by a reaction hereinafter explained. Passing from regenerator 7 through gooseneck 8 to collector 9, the regenerated adsorbent is separated from the gases accompanying it and removed from the system by pipe 10.

Regeneration medium introduced by pipe 11 is carbon dioxide gas, or carbon dioxide gas admixed with nitrogen or air, in such ratios of mixture that any reaction between the regeneration medium and the carbonaceous deposit upon the spent adsorbent is an endothermic reaction, such as the reaction

$$CO_2 + C \rightarrow 2CO$$

which predominates.

The effluent gases from regeneration, rich in carbon monoxide, pass from collector 9 into pipe 12, whence a portion of these gases are lead through pipe 13 by gas pump 14, and introduced through pipe 15 into combustion tube 16, which is centrally disposed in regenerator 7. Air for the exothermic combustion of carbon monoxide to carbon dioxide is provided from pipe 17 through a plurality of spaced inlets 18. The exothermic combustion occurring within tube 16 is controlled to furnish a proper amount of heat for the endothermic regeneration occurring in regenerator 7 surrounding tube 16. A portion of the carbon monoxide-containing gas is diverted from pipe 15 by pipe 19 and led to burner 20, wherein it is burned to furnish heat for preheater 6, the flue gases from which are exhausted to atmosphere through vent 21.

A further portion of the gases from regeneration, rich in carbon monoxide, are led by pipe 22 to combustion chamber 23, to which air is introduced from pipe 17 by pipe 24. Within chamber 23, these gases are subjected to exothermic combustion to carbon dioxide. The carbon dioxide-containing gases from combustion tube 16 are led into chamber 23 by pipe 25.

The hot gases from combustion chamber 23 pass out through and are partially cooled in air preheater 26 through which compressed air is lead from a source not shown, the air so heated furnishing supply for air pipe 17, previously mentioned. Partially cooled gases from 26 pass to pipe 27, from which a portion passes through pipe 28 and gas pump 29 to pipe 11 to be introduced to the regeneration as a source of carbon dioxide. Pipe 30, connecting pipes 28 and 22 is for use in starting up during the period prior to the establishment of normal operating atmospheres within the various portions of the system. A portion of the partially cooled gases from pipe 27 are passed through a waste heat boiler 31 and exhausted to atmosphere through vent valve 32. A portion of the gas from pipe 28, after passing through feed water heater 33 wherein it is cooled, is compressed by compressor 34 and passed through pipe 2 to vessel 1 to furnish the motive power to introduce spent adsorbent therefrom into the system. If desired, steam may be admitted to the regeneration reaction either at the regenerator by valve 35 or before preheat by valve 36. This steam may be superheated, if desired, by passage through the preheater in pipe 37, as shown.

It will be observed that the principle of operation followed herein is that of a wholly endothermic regeneration reaction conducted in heat exchange relationship with an exothermic combustion of regeneration products and controlled by the conduct of such exothermic reaction. The control is achieved by varying the intensity of the burning of carbon monoxide in pipe 16, as by varying the amount of gas introduced by pump 14 and air introduced by pipe 18.

It is to be preferred, that the adsorbent to be regenerated should be at least partially freed of those contaminants which can be removed by physical means. For example, fuller's earth used in petroleum filtration should be steamed until substantially free of entrained oil or wash liquor prior to being charged to the system herein set forth.

As indicated above, the regeneration medium need not be entirely oxygen-free. In fact, it is likely that it will not be solely a mixture of carbon dioxide and nitrogen such as would result from complete consumption of air. It will normally contain, in addition to these, some carbon monoxide, some water vapor and some oxygen. It is important, though, that the relative percentages of these materials should be sufficiently low so that the regeneration reaction is substantially endothermic in nature, resulting in the production of a substantial relative proportion of carbon monoxide.

It is recognized that there are known processes of regeneration wherein the spent adsorbent is regenerated in an atmosphere which may be diluted by the return thereto of flue gas produced by the regeneration, which flue gas contains carbon dioxide, the dilution probably resulting in some incomplete combustion with resulting production of carbon monoxide. This process does not partake of that nature being conducted with a regenerating medium sufficiently devoid of free oxygen, and sufficiently rich in carbon dioxide, for the predominant reaction to be the endothermic reaction between carbon and carbon dioxide to form carbon monoxide. It is also recognized that there are known processes wherein the spent adsorbent is regenerated in an isolated atmosphere, (which may be reducing) in a passage surrounded by a combustion to which flue gas from said combustion has been returned to control its intensity. It will be recognized that this principle is not made use of here.

It will further be recognized, so far as apparatus is concerned, that many other forms of apparatus may be provided in which the process may be carried out, yet that all these are a part of my invention, subject to limitations as claimed. For example, since the heat demand for the endothermic reaction $CO_2+C \rightarrow 2CO$ for one pound of carbon contaminant is less than the corresponding heat available from the reaction $2CO+O_2 \rightarrow 2CO_2$, there are provided two combustion zones, viz, 16 and 23. It will be obvious that either a portion of the gases may be burned in 16, or that all may be burned in 23 and a portion led in heat exchange with 7 to provide needed heat, or all may be burned in 23 and some fluid heat transfer medium may be used to transfer heat from 23 to 7.

While it is preferable to conduct the operation shown under pressure slightly above atmospheric to prevent infiltration of unwanted air, the pressure may be increased considerably above this, if desired, to secure more rapid and more thorough reaction.

This application is a division of my co-pending application S. N. 232,745, filed October 1, 1938, now United States Patent #2,261,151.

I claim:

1. An apparatus for regenerating spent adsorbents carrying carbonaceous impurities comprising an elongated regenerating chamber, means for introducing spent adsorbents to said chamber and means for removing regenerated adsorbents from the opposite end thereof, means for introducing a gaseous regenerating agent to said chamber and means at the opposite end thereof for withdrawing flue gases, a separate combustion chamber equipped to convert carbon monoxide to carbon dioxide and positioned in indirect heat exchange with said regenerating chamber, means for introducing gas to said combustion chamber and means at the opposite end thereof for withdrawing flue gases, a gas line for passing flue gases withdrawn from said regenerating chamber to means for introducing gas to said combustion chamber, and a gas line for passing flue gases withdrawn from said combustion chamber to means for introducing gas to said regenerating chamber.

2. An apparatus for regenerating spent adsorbent particles carrying carbonaceous impurities comprising two elongated, concentric chambers which are separated by a heat conducting wall so that the chambers are in indirect heat exchange with each other, means for admitting spent adsorbents to one of said chambers and means for withdrawing regenerated adsorbents from the opposite end thereof, means for introducing a gaseous regenerating agent to this first chamber and means at the opposite end thereof for withdrawing flue gases, means for introducing gas to the second chamber and means at the opposite end thereof for removing flue gases, a gas line for passing flue gases withdrawn from said first chamber to said means for introducing gas to said second chamber, and a gas line for passing flue gases withdrawn from said second chamber to said means for introducing gas to said first chamber.

3. An apparatus for regenerating spent adsorbent particles carrying carbonaceous impurities comprising an elongated regenerating chamber adjoining to and in indirect heat exchange relationship with a first combustion chamber, a second independent combustion chamber, means for introducing gas to and withdrawing flue gas from each of said combustion chambers, means for introducing spent adsorbents to said regenerating chamber and means for removing regenerated adsorbents from the opposite end thereof, means for introducing a gaseous regenerating agent to said regenerating chamber and means at the opposite end thereof for withdrawing flue gases, gas line means for passing flue gas withdrawn from said regenerating chamber to each of said combustion chambers, and gas line means for passing flue gases withdrawn from each of said combustion chambers to said regenerating chamber.

4. An apparatus for regenerating spent non-carbonaceous contact material carrying carbonaceous impurities comprising an elongated regenerating chamber, means for suspending said spent contact material in a stream of gaseous regenerating agent, means for introducing said stream of gaseous regenerating agent carrying said spent contact material into said elongated chamber, means at the opposite end of said chamber for withdrawing gaseous agent carrying suspended contact material, means for separating suspended contact material from said withdrawn gaseous agent, a separate combustion chamber equipped to convert carbon monoxide to carbon dioxide and positioned in indirect heat exchange relationship with said regenerating chamber, means for introducing gas to said combustion chamber and means at the opposite end thereof for removing gas, a gas line for passing said gaseous agent from said contact material separating means to said means for introducing gas to said combustion chamber, and a gas line for passing gases removed from said combustion chamber to said regenerating chamber.

5. Apparatus for regenerating spent non-carbonaceous contact material carrying carbonaceous impurities which comprises, a vertically elongated regenerating chamber, a plurality of conduits discharging into the bottom of said chamber in substantially parallel relationship along the long axis thereof, feed chamber means for spent contact material disposed below said regenerating chamber, passageway defining means leading upwardly from said feed chamber means to said conduits, means for passing regenerating gas upwardly through said passageway defining means so as to carry spent contact material in suspension from said feed chamber means through said conduits into and through said regenerating chamber, a solid gas separator disposed in the path of the fluid stream at the top of said regenerating chamber, and means for bringing a fluid heat exchange medium into indirect heat transfer relationship with said contact material for controlling the temperature of the latter in said regenerating chamber within an efficient regenerating temperature range.

FRED L. FAST.